United States Patent [19]
Stapleton et al.

[11] Patent Number: 5,832,140
[45] Date of Patent: Nov. 3, 1998

[54] AUTOMATED QUALITY ASSURANCE IMAGE PROCESSING SYSTEM

[75] Inventors: John J. Stapleton, E. Brunswick, N.J.; Christopher Lord, New York, N.Y.

[73] Assignee: Staplevision Inc., East Brunswick, N.J.

[21] Appl. No.: 457,676

[22] Filed: Jun. 1, 1995

Related U.S. Application Data

[62] Division of Ser. No. 166,801, Dec. 14, 1993, Pat. No. 5,537,483.

[51] Int. Cl.⁶ .............................. G06K 9/32; G06K 9/48; G06K 9/36; G06K 9/03
[52] U.S. Cl. .......................... 382/298; 382/199; 382/232; 382/287; 382/300
[58] Field of Search .................................... 382/137, 139, 382/140, 156, 168, 171, 199, 232, 254, 266, 275, 286, 289, 298, 309, 317, 305, 282, 287, 300; 358/403, 405, 462; 364/552, 554

[56] References Cited

U.S. PATENT DOCUMENTS

| | | |
|---|---|---|
| 3,945,715 | 3/1976 | Drake ........................................ 350/150 |
| 3,983,320 | 9/1976 | Ketcham et al. ........................ 178/6.8 |
| 4,613,269 | 9/1986 | Wilder et al. .............................. 348/92 |
| 4,809,345 | 2/1989 | Tabata et al. ............................ 382/300 |
| 4,888,812 | 12/1989 | Dinan et al. ............................. 382/305 |
| 4,903,145 | 2/1990 | Fumada .................................... 358/462 |
| 4,995,090 | 2/1991 | Singh et al. ............................. 382/213 |
| 5,040,215 | 8/1991 | Amano et al. ............................ 381/43 |
| 5,272,535 | 12/1993 | Elabd .................................. 358/213.11 |
| 5,410,619 | 4/1995 | Fujisawa et al. ........................ 382/199 |
| 5,572,608 | 11/1996 | Edgar ...................................... 382/321 |

*Primary Examiner*—Bipin Shalwala
*Attorney, Agent, or Firm*—Kane, Dalsimer, Sullivan, Kurucz, Levy, Eisele and Richard, LLP

[57] ABSTRACT

An image processing system with a quality assurance feature is disclosed for determining the quality of the images being processed. The system includes a plurality of sections operating independently and concurrently to insure reliability. One section includes calculation of a quality assurance parameter dependent on the fill factor and the compression ratio determined before and after compression respectively. A second section includes histogram hardware for generating qualified histograms representative of foreground data, and background data transitions and a comparator for detecting overlap therebetween. A third section develops a histogram parameter based on the areas of the histograms and compares this parameter to the quality assurance parameter for concurrence. The system also includes autosizing means for detecting the borders of an image using fuzzy logic.

5 Claims, 8 Drawing Sheets

AUTOMATED QUALITY ASSURANCE IMAGE PROCESSING SYSTEM

This is a divisional of application Ser. No. 08/166,801 filed on Dec. 14, 1993, now U.S. Pat. No. 5,537,483.

BACKGROUND OF THE INVENTION a. Field of Invention

This invention pertains to a multiprocessor image system which automatically performs real-time analysis on a scanned image to determine quality and acceptability of the digital image and the scanner. The image may then be instantly rejected, if its image enhancement does not improve the output image. The system is particularly adapted for high volume electronic storage and/or transmission of compressed images for example documents, facsimile, drawings, and so on, and it also automates image centering and cropping.

b. Description of the Prior Art

The art of image processing and data storage has evolved to a stage whereby a large volume of images can be stored and rapidly retrieved electronically. This procedure is advantageous because the electronic storage and retrieval of images is much quicker and more space efficient and cost effective than the storage of hard copies or even microfilms of the documents.

Furthermore, the electronic images can be reproduced without limit and stored for a relatively long time period while hard copies or duplicate microfilms deteriorate rapidly. However, before the images of the documents are stored electronically, they must be checked to insure that they provide meaningful information, or in other words that they are of acceptable quality. There is no reason to process and store images which are so poor that they can not restore essential information.

Presently, this quality control can be accomplished only by questionable visual inspection, which admitted the poor images. Thus typically, each hard copy, or the microfilm must be visually examined by a well trained person before the image conversion and storage occurs. Of course, this type of operation is quite expensive and time consuming, i.e. several minutes vs. milliseconds of this invention.

Similarly, the practice of transmitting information through electronic data transmission, including facsimile communications, has become wide spread and in effect has revolutionized the manner in which documents are exchanged between various parts of the world. However, up to now there was no way to determine either before transmission or after reception whether the quality of a compressed image met any minimal standards without an actual visual inspection. However, frequently such inspection is not immediately possible, for example, if the transmission occurs over great distances spanning several time zones.

OBJECTIVES AND SUMMARY OF THE INVENTION

In view of the above-mentioned problems in the art, it is an objective of the present invention to provide an image processing system in which electronic images are automatically checked, enhanced or rejected to insure that they meet certain minimum quality standards, whereby meaningful documents may be reconstructed from the retained images.

A further objective is to provide an image processing system which can process digitized documents independently of their size, orientation or borders, by automated cropping and centering.

Yet another objective is to provide an image processing system which can verify or crosscheck the concurrence of evidence among multiple discriminants in multiple CPU's so as to maximize the QA confidence limits as follows:

1. It can crosscheck the ratio of Input/Output bits of the image compressor to verify the ratio of black/transition pixels derived independently in real-time from histograms of the sensor A/D.
2. It can crosscheck the histogram's first vertical line detected at the scanners A/D with the automated border detection derived from the scanner out and thus calibrate micropositions.
3. It can verify input film/paper content by deconvolving its real gray levels histograms from the resultant signal corrupted by the scanner's spatial and temporal sampling process.
4. It can verify scanner output for known inputs e.g. opaque, clear and micropositioned reticle image so as to compute errors signals to fully automate calibration of the scanner.
5. It can adapt thresholds within an image and from image to image to enhance quality and reduce noise by the weighted sum of local average and means of Dmax, Dmin medians which are recursively in real-time histograms.
6. It can instantly predict diminishing contrast gaps and "visibility" by crosschecking binary percentiles (50%, 25% , . . . 3%) with all the probability distribution functions without intensive computations of their statistical moments.

INTRODUCTION

AQA is the "concurrence of evidence" and growing aggregate of computer activities, taking the place of human vision, observations, decisions & restoration efforts, whereby the real-time design analysis of imaging devices, inputs and outputs, is converted and applied to self-regulation adaptive feedback control, by 100% inspection and statistical sampling for defects, to be corrected, enhanced, or rejected to ensure adequate quality as per design, and restore "complete confidence" in the Total Optoelectronic Process Imaging Communication System (TOPICS).

AQA (Automated Quality Assurance) is a system that analyzes image quality of aperture cards, microfiche, facsimile, etc. Image quality is required in digitizing images in order to maintain a viable and consistent image database or to provide a level of confidence when transmitting facsimiles—"faithful fax".

Prior to AQA image quality was determined manually, a human operator had to inspect each image to insure that the image being stored, for instance to optical disc, would be readable upon retrieval. The purpose of AQA is the reduction of this expensive and time consuming process by automation. The QC process is manual or automatic, no time overhead is added by AQA.

AQA is a synergism of both hardware and software, that must operate, in real-time, in conjunction with the scanner and image compressor. Since analysis is concurrent with scanning, an image can be rejected before the entire image has been scanned thereby saving scan-time. AQA is utilized during the scan process to classify and correlate the film contents with the output of the scanner. AutoSizing crops the film contents to the border of the image. AutoSizing will crop unnecessary data for AQA analysis and reduce the size of the compressed image. Another proprietary test known as "B over C" is utilized after the scan-compress process as a final "quality quotient". The "B" is the number of black pixels scanned in the window and "C" is the CCITT group 4 file size.

AQA HARDWARE

Most scanners digitize images in four to eight bits of gray scale and later transform this signal to binary data based on certain criteria, filters and threshold circuits etc. AQA needs the gray scale data before the scanner has generated its black-white (binary) output to auto-verify image input data. Unfortunately, some scanners do not readily provide this data, therefore external circuitry may be used to extract this essential signature data from the sampled signals.

AQA is interfaced to the scanner analog-to-digital converters by means of a small probe PC board that intercepts the internal signals of the scanner and transmits them to AQA hardware for deconvolution of the scanner output and input. The five most significant bits of gray scale data per camera are the primary data analyzed by AQA, which prepares three "Quality" bits from its own image processing circuits or from the scanners filters. Other timing, control and scanner status signals are used to synchronize AQA hardware and software with the scanning sequence.

The AQA "Hardware Histogram" subsystem comprises of 256 by 16 RAM and a PAL incrementer which functions similar to an array of 256 sixteen bit counters such that each qualified gray scale value (0–255) is read into the hardware histogram it is used to increment its associated counter. There are two banks of hardware histograms that are ping-ponged between computer sequential access and real-time random video incrementing to allow simultaneous data collection and analysis. To prevent 16 bit overflow in hardware the two banks are alternated every eight scan lines. This data structure provides a function that describes the frequency of occurrence of each gray scale per eight scan lines.

Prior imaging techniques have extensively made use of histograms to determine thresholds and adjust contrast of gray scale images. AQA uses a novel approach to decompose film contents by "qualifying" each gray scale pixel in relation to its neighbors. The histograms are "qualified" by a gray-scale input, black-white output, spatial-filter with a hardware/software adaptive threshold. The spatial filter is a device that computes the binary value of a given gray scale pixel based on its neighbors. There are three bits derived from the spatial filter that qualify the gray levels. By using three bits of qualifying data AQA produces eight histograms. The three bits are known as the output of the spatial-filter (SFO), the input to the spatial-filter (SFI) and the output of the previous spatial-filter comparison we call the last state-bit (LSB). There are two last-state-transitions from LSB exclusive-OR'ed with instant SFI known as LSBx and LSBy. (see table below) LSBx histogram count the number of binary 'transitions' in the x dimension. LSBy histograms do likewise in the y dimension. SFI and SFO histograms represent the single pixel noise cancellations.

The three qualifier bits become the most significant bits and the five gray bits are appended. This is the eight bit value used as it were an index to the sixteen bit counters referred to above. Since the "Hardware Histograms" are driven by the scanner CCD's or laser, hardware is continually incrementing qualified gray values while the scanner is powered. Software clears both histograms once a scan sequence starts.

AQA SOFTWARE

This real-time software is dictated by hardware video speeds and thus is highly optimized, hand-tweaked, entirely inline code, i.e. without any time consuming loops. Quick 32 bit software allows the hardware histograms to be simplified to 16 bits despite some input images exceeding 60 megabytes, i.e. a 6800 by 8800 gray scale image. The balance between the high cost/high speed of hardware verses the flexibility/relatively slow execution time of software has produced an elegant solution where hardware and software combined have greater value than the two apart.

Software reads the eight histograms and composes another histogram set representing the signature of the entire image, this histogram is called the cumulative histogram. Software, per 8 qualifier states, sums the count of each of the 32 gray values, for both the eight scan line histogram and the cumulative histogram. This sum is actually the area of the histogram under the function for the given qualifier. This area for each qualifier is then successively divided by two (binary shifted left one place) yielding the qualified area divided by 2, 4, 8, 16, and 32 or 50%, 25%, 12%, 6% and 3% respectively.

AQA determines whether an image has good contrast by comparing respective percentiles complimentary of paired histograms per table below. If the intersection of (000 and 111) the two histograms has a large overlapping area then the image is rejected due to poor contrast. A gap of one b the 3% percentiles of background/foreground Dmax/Dmin indicates the "visibility" threshold. This simply defines the "visibility" threshold between "good contrast" and "poor contrast". If all of percentile lines of H0(see FIGS. 9 and 10) are to the left of corresponding percentile lines of H7 then the image is acceptable. If any of the percentile lines are to the right of the corresponding percentile lines of H7 then the image may be unacceptable. The gap of one over the range of 32 (0 thru 31) gray (density) levels (see FIGS. 6–10) ensures that less than 3% of 8 lines of video have a contrast signal less than 3% in amplitude, the typical noise level.

The intersecting area is computed by starting at one end of the qualified histogram and adding the gray count values until fifty percent of the area is found. The gray value at fifty percent is saved. The area of seventy-five percent of the histogram is computed by continuing at the gray value and adding the gray counts until seventy five percent is found. This is repeated again for 87%, 93%, and 96%, for each of the eight qualified histograms for both the eight line histogram and the cumulative histogram. The gray values "gaps" are programed (off-line) for known distributions (normal, log-normal, Rayleigh, etc.). The gray value found for 50% (the median) of the area for qualifier seven (foreground data) should have a gray value in the upper scale of the 32 gray values. Conversely, the gray value found for 50% of the area for qualifier zero (background data) should have a gray value in the lower scale of the 32 gray values. The same pronounced gap between the median of the foreground and background histograms is critical because the expected value of the absolute deviation from the median is a minimum.

The Quality Adaptive Threshold (QAT) calculates the value that determines whether a given gray scale pixel is mapped to black or white.

$$QAT = TF*NNA + TF'*MM$$

where TF is the Threshold Factor entered manually, or derived in the host CPU to enhance edge transitions, where NNA is the Nearest Neighbor Average (computed in hardware) and where MM is the recursive "Mean of the Medians". MM and TF form a byte MMTF.

$$TF' = 1 - TF$$

Mean of the Medians is:

(NextDmin+NextDmax)/2, where
NextDmin=Alpha*LastMedianDmin+Beta*CurrentDmin
NextDmax=Alpha*LastMedianDmax+Beta*CurrentDmax,
where Alpha is in the range 0.0 to 1.0 (0 to 15)/16, and Beta is 1-Alpha and thus determine the time constants of the filter transfer function response to local or global variations in density.

LastMedianDmin is the foreground median density used in the calculation of MMTF for the prior eight scan line histogram.

LastMedianDmax is the background median used in the calculation of MMTF for the prior eight scan line histogram.

CurrentDmin is the foreground median or the gray value where fifty percent of the total area for qualifier 7 was found for this eight line histogram.

CurrentDmax is the background median or the gray value where fifty percent of the total area for qualifier 0 was found for the eight line histogram.

The Mean of Medians is computed and written to hardware every eight scanlines.

An image is processed for storage by first generating with an appropriate sensor a plurality of analog signals, each signal corresponding to the gray level of each indivisible two-dimensional section of the image commonly known as a pixel. The analog signals are converted into digital signals, and after image processing, they are fed into a compressor to reduce the number of stored or transmitted bytes required for each image. The compressor in effect encodes the data using an efficient algorithm which statistically eliminates redundancy without losing information, quality or picture detail. One such algorithm is the CCITT-Group 4 Data Conversion standard well known in the art.

As part of the algorithm, a compression ratio is derived. The compression ratio (CR) is the ratio of the number of pixels per image to the number of compressed bits (c) produced for that image by the compressor. The compression ratio is therefore indicative of the image edges and efficiency of the compressor. The image data before compression is often characterized by using the fill factor (FF). The fill factor is the ratio of the number pixels which are completely black in a positive image (b) to the total number of pixels per image. The system described herein takes advantages of the phenomenon that for acceptable images the product of CR and FF approaches unity independently of the sensor means or the quantity of information in the image. In effect the two factors counterbalance each other. For an image which is very busy, i.e. it contains a lot of information, the corresponding document will have many edges and black pixels and therefore CR is low but FF is high. More bytes are required to compress this busy image and therefore CR is low. Conversely for a sparse image with few black pixels or transitions FF is low. The number of edges and compressed bytes is low, and therefore CR is relatively high. In addition this criteria holds true over wide ranges of information, but not if the images have been scanned improperly or have not undergone error correction. However, an overexposed image will have the general characteristics of both CR and FF high, while an underexposed image will have both CR and FF low. Thus, for an image having an unacceptably poor quality the product FF×CR will be either much larger or much smaller then unity.

Advantageously, since
FF=b/total pixel number and
CR=total pixel number/c

FF×CR=b/c

Therefore, in the present invention, the ratio b/c, hereinafter referred to as the quality quotient (QQ) is calculated and used as one criteria for image quality. More particularly as each image is digitized and compressed, its quality quotient is analyzed to determine if it is within a preselected range. If it is not within this range than the image is not stored but is tagged as being questionable. The preselected range may be determined for example by generating an average quality quotient and standard deviation for all the images of a particular batch by linear regression analysis of the log CR vs. log FF where the standard deviation of log CR given log FF is significantly less than either's standard deviation.

The quality quotient described above may be incorporated in other types of imaging devices such devices used for longdistance image transmission systems. The quality quotient may also be sorted together with the image data and when retrieved it may be used as a test to determine whether the retrieved image has been compromised.

In addition to developing the quality quotient for an entire image, the present system also partitions each image into several sections and performs real-time image analysis as the image is scanned to determine whether each image section is acceptable. More particularly the A/D byte corresponding to each pixel is compared to the bytes corresponding to the neighboring pixels, and filtered to eliminate spurious noise effects. The system also develops and processes in real-time the histogram for each image section to determine if the section is acceptable.

In addition, the actual pixel densities of the image are passed through an adaptive threshold detector and spatial filters. Together these two elements qualify the pixel densities by identifying and correcting for true transitions between foreground and background data and false gray levels due to sampling, noise, dirt on the film and so on. The resulting densities are used to construct quality histograms which define background data, foreground data, as well as transitional stages in between. The system, then quantitatively measures the separation or overlap between these histograms. Excessive overlaps are indicative of images with low contrast or noise problems.

In certain instances the images are provided either with no border, or the border containing information is smaller than the size of the image. For example, if engineering drawings have standard sizes designated as A, B, C and so on which do not fill a 35 millimeter frame when reduced because of the different magnification or aspect ratios of these formats. Thus a portion of the film frame is supposed to be blank. If the whole film is automatically encoded, dirt, or other imperfections of the film may cause the system to encode the clutter in border areas also. However encoding the noisy border area is wasteful and furthermore may lead to errors in the compression or quality assurance process. Therefore the present invention also teaches cropping of images with borders and sizing of images without borders or size codes. Cropping refers to a step whereby over-scanning data is limited only to an area of the image which is substantially within the borders. Sizing refers to a process whereby only an area within an image without border is scanned, said area being disposed between artificial borders defined by feature-extraction of the outermost limits of the image elements.

DETAILED DESCRIPTION OF THE INVENTION

The following description illustrates how an automated quality assurance (AQA) image processing system may be used to check and store images originally recorded on a 35 millimeter microfilm or microfiche. Typically the microfilm is held within the aperture of a Hollerith card. Information regarding the microfilm is hole-punched and is readable from the card but most often omits the drawing size or reduction factor. It should be understood that the present AQA system could be used equally well for other scanner or fax environments as described more fully below.

Figure 1:
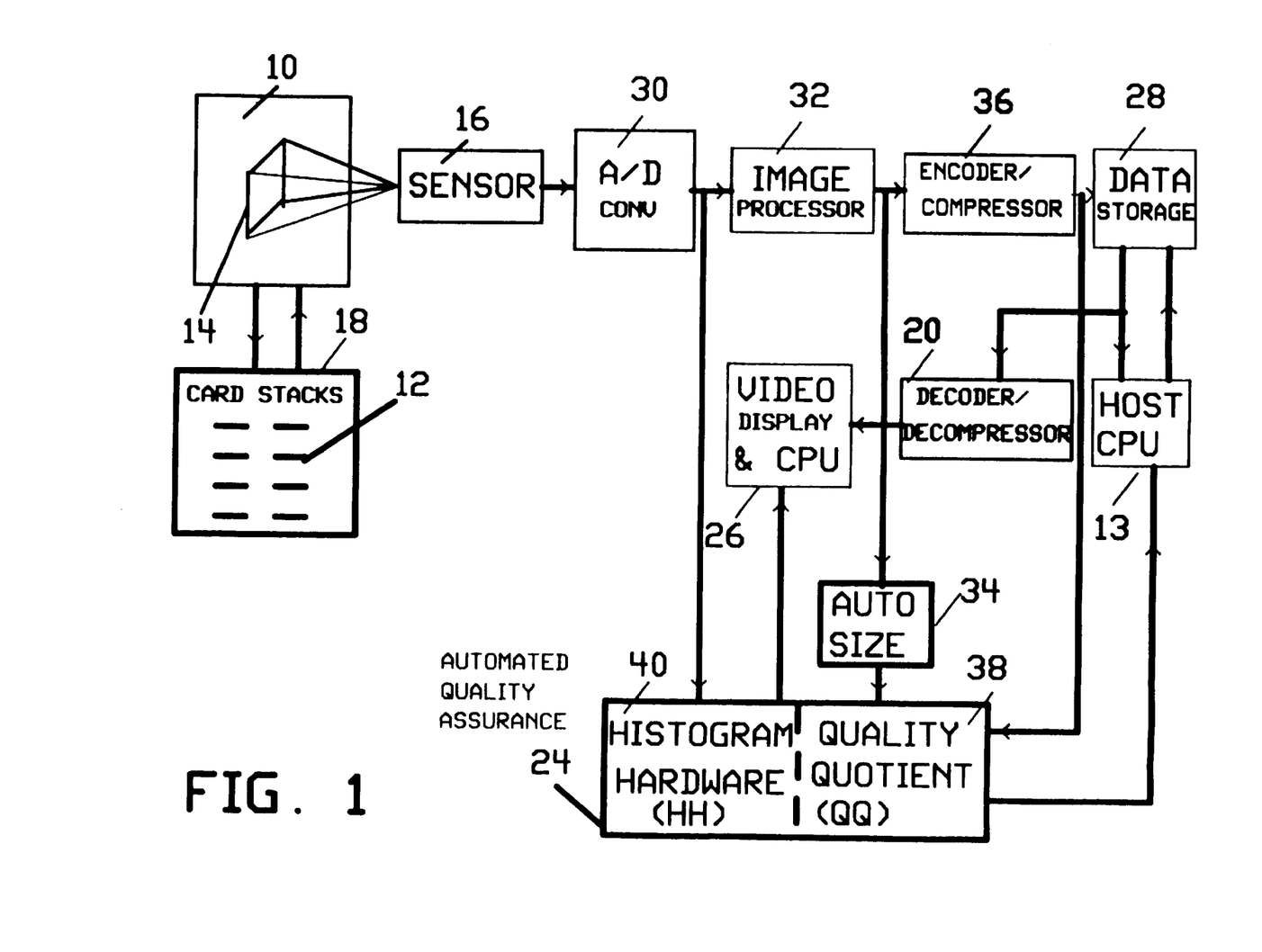
FIG. 1 shows a block diagram for an automated quality assurance image processing system constructed in accordance with this invention.

A system for converting and storing images from aperture cards is shown in FIG. 1. The scanner includes a card holder 10 for holding a card 12 (which may be for example an aperture card, or any other media with an image) with an image 14 for sensing by an image sensor 16. Image sensor 16 may be a CCD device, a laser detector, TV camera and so on. Also associated with the card holder 10 are stack holders 18. The cards are fed from these stacks to card holder 10 for scanning. After a card is scanned, it is returned to the stack holders 18.

Sensor 16 generates signals which are fed to a A/D converter 30 and image processing section 32. Image processor 32 converts these signals into a multidimensional array corresponding to the image without measuring if the image has an acceptable quality, and holds these signals until further processing is completed.

The image, and/or the intermediate and final results of the image processing may be displayed on a video display/CPU 26. If the data corresponding to an image is found by AQA to be acceptable, it is sent to a data storage element 28. Element 28 may be for example a floppy, or hard disk, magnetic tape, a WORM etc. under the control of a host computer 13. Images from data storage 28 are fed to video display/CPU 26 through a decoder/decompressor 20 which reverses the operation of compressor 36.

The digital signals are also fed from processor 32 to an autosizing or image adjusting element 34 which discards the undesirable noisy margins from the image by cropping or sizing it as detailed below. After cropping or sizing, the signals are fed into a quality assurance element 24. This section includes a quality quotient section 38 and hardware histogram section 40. The quality quotient section 38 develops a quality quotient (QQ) for an image and compares it by linear regression analysis to a statistical range. Independently of the quotient section, the histogram hardware section 40 also manipulates the gray scale data to construct histograms for the image and to determine from said histograms the quality of the image 14. Thus, elements 38 and 40 determine independently using different criteria whether an image is acceptable. Their outputs are combined and based on these outputs, the quality discriminator 42 (see FIG. 2) either accepts the data and sends it on to the data storage 28 or rejects the card in stack 18 or host 12'. In some instances, at least, some of the images are reviewed a second time after a full run to insure that they meet the required criteria, as described below.

Figure 2:
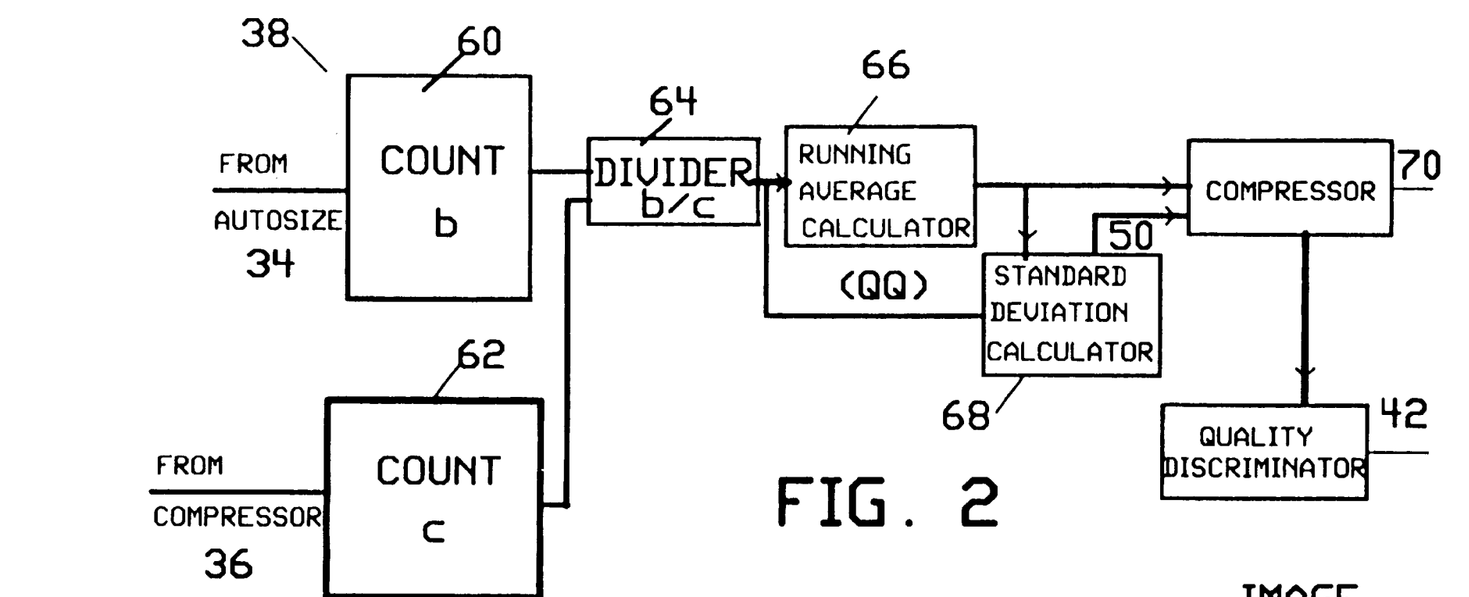
FIG. 2 shows details of the quality quotient section of FIG. 1.

Details of the quality quotient section 38 are shown in FIG. 2. The digital data corresponding to the image from the autosizer 34 is used by counter 60 to count the number of filled-in pixels (or black pixels b) i.e. the number of pixels having a value above a threshold on a gray scale. Similarly a file size software counter 62 counts the number of bits generated by compressor 36. When these two counters complete the respective counts for a whole image, a software divider 64 is used to generate the quality quotient QQ which as previously described is given by $QQ = b/c$ The system described herein is adapted to check and store a whole batch of images normally related to the same supplier or subject matter. The quality quotient element preferably compares b and c by linear regression analysis known in the art of QC and also the quality quotients of the individual images to a running average quality quotient (QQRA) and compares the individual QQ's to QQRA. More particularly, the quality quotient element 38 includes a routine 66 to calculate the running arithmetic average of the QQ's, QQRA, and an RMS and a standard deviation routine 68 for calculating a running standard deviation SD for the quality quotient. Finally element 38 also includes a comparator 70 which compares the quality quotient for each image to the QQRA+/−SD for that particular batch and determines whether QQ is within a preselected range of QQRA, for example one standard deviation SD. If the difference is less than SD, the comparator sends a signal to a quality discriminator 42 that the image has passed the quality quotient test. Otherwise, the comparator indicates that the image has failed the test.

Initially the values of QQRA and SD tend to fluctuate for each batch of images, and as a result a few of the images at the beginning of the run may be accepted or rejected incorrectly. Therefore, after a batch of images has been processed the quality discriminator 42 issues a command to recheck each QQ without a rescan using the final batch values for QQRA and SD obtained in this batch run alone. Alternatively, each reject image can be run while in the scan station through the QQ test a second time at better threshold parameters.

Figure 3:
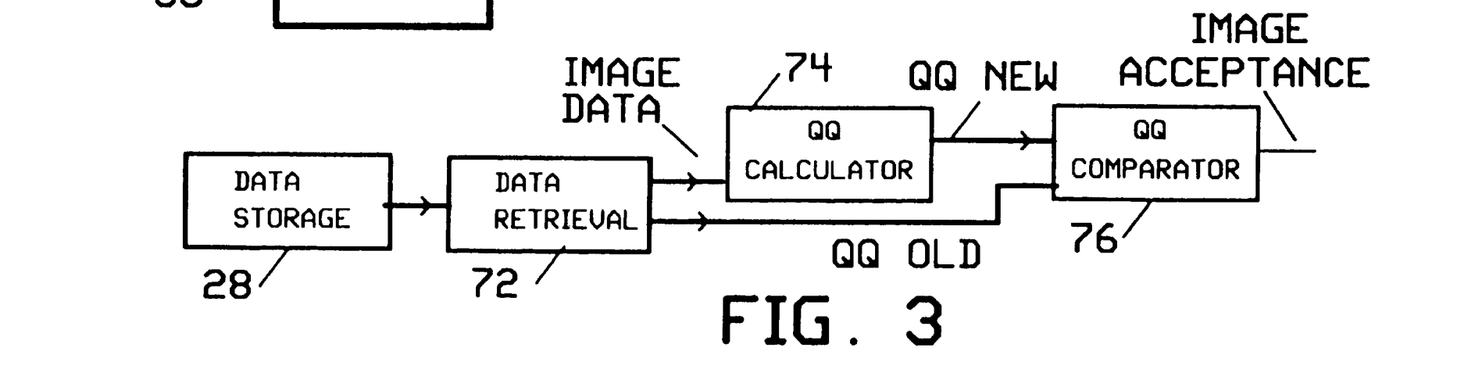
FIG. 3 shows as a first alternate embodiment of the invention a data retrieval system making use of the quality quotient as a means of indicating image quality.

Importantly, for accepted images the qualifier quotient is also sent to the quality determinator 42 for eventual storage in data storage element 28. Then, the data corresponding to an image is recalled together with the initial qualifier quotient QQOLD as shown in FIG. 3 by a data retrieval element 72. The retrieval element separates the compressed image data and after decompression sends the image data to a quality quotient routine 74 for calculating an updated quality quotient QQNEW. The two quotients are compared in a comparator 76. If QQNEW is identical to QQOLD then the image is acceptable and the compactor generates an image acceptance output signal. If QQNEW is outside the preset range, the image data was somehow corrupted and should not be accepted.

Figure 4:
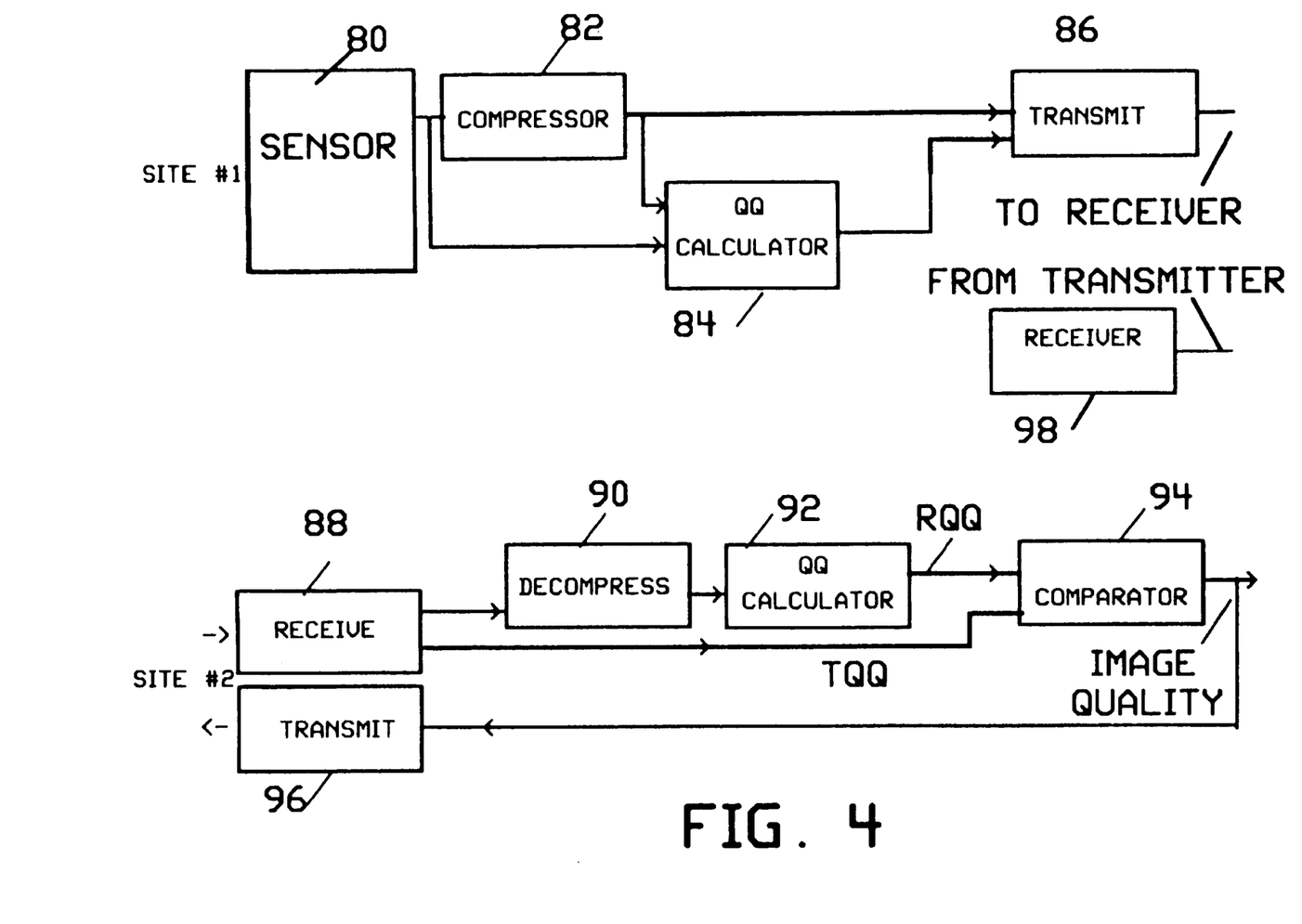
FIG. 4 shows as a second alternate embodiment of the invention an image communication system making use of the quality quotient as a means of indicating image quality.

In another embodiment of the invention, the quality quotient is used in a compressed image transmission system such as a facsimile transmission system for indicating whether the received image has the same quality quotient as the transmitted image. A system for exchanging images between a site No. 1 and a site No. 2 is shown in FIG. 4. At site No. 1 a sensor 80 is used for generating data corresponding to an image. The scanner may include analog-to-digital conversion means. The data from the scanner is fed to a compressor element 82 for compression. A quality quotient calculator counts the number of black pixels and the number of compressed bites for each image to generate the quality quotient. This quality quotient QQ is fed to transmitter 86 together with the compressed data for transmission to site No. 2.

At site No. 2 a receiver 88 receives the compressed data from transmitter 86. (For the purposes of this discussion the terms transmitters and receivers are used generically as any devices necessary for data transmission including any modulators or other elements as required by the data transmission path). The receiver separates the compressed data from the transmitted quality quotient TQQ. The received data is decompressed by decompresser 90 and a quality quotient calculator 92 is used to calculate a received quality quotient RQQ for the received image. The transmitted and received quality quotients are compared in a comparator and the comparator 94 generates an image quality signal indicative of whether the RQQ is within a range (R) of TQQ or not.

Optionally, the image quality signal is sent back to site No. 1 through a transmitter 96 and a receiver 98. If the received image has been corrupted by noise or other factors so that the RQQ is outside the selected range with respect to TQQ, (i.e. if RQQ>TQQ+R or RQQ<TQQ-R) a decision can be made to retransmit the image. Importantly, this decision can be made automatically whereby no operator intervention is necessary. This is important for situations where the sites are separated by several time zones so that for example no operator is available at the image receiving site, or for situations where images are saved at the transmitting site for several hours until rates for using telephone lines have dropped.

The histogram hardware 40 (FIG. 1) generates and analyzes histograms for each image and generates a real-time independent signal indicative of whether the image is acceptable or not. The previously described b/c elements operated on parameters derived after the image data and can not easily handle these parameters in real-time. However, the histogram hardware must operate on the image data itself and if the image is scanned at a high definition, only supercomputers may have the required capability and/or speed to operate in real-time. Therefore it is preferable to partition the image both in the space domain and the time domain to insure that real-time processing can take place to correct or abort scans as soon as possible. First the image is partitioned into a preselected number of image areas defined in any convenient manner e.g. 16-bit arithmetic. For example the image may be partitioned into several vertical strips each being less than $65,536=2^{16}$ in 8 columns. It has been found that this partition is advantageous because analysis can be handled easily by a 32 bit standard data processor based on 286 or 386, 68HCOOO microprocessor chips. Second, histogram hardware preferably includes two sections operating in parallel, one section collects data while the other is analyzed. In this manner, real-time histogram generation and analysis of the image can be processed simultaneously.

Figure 5:
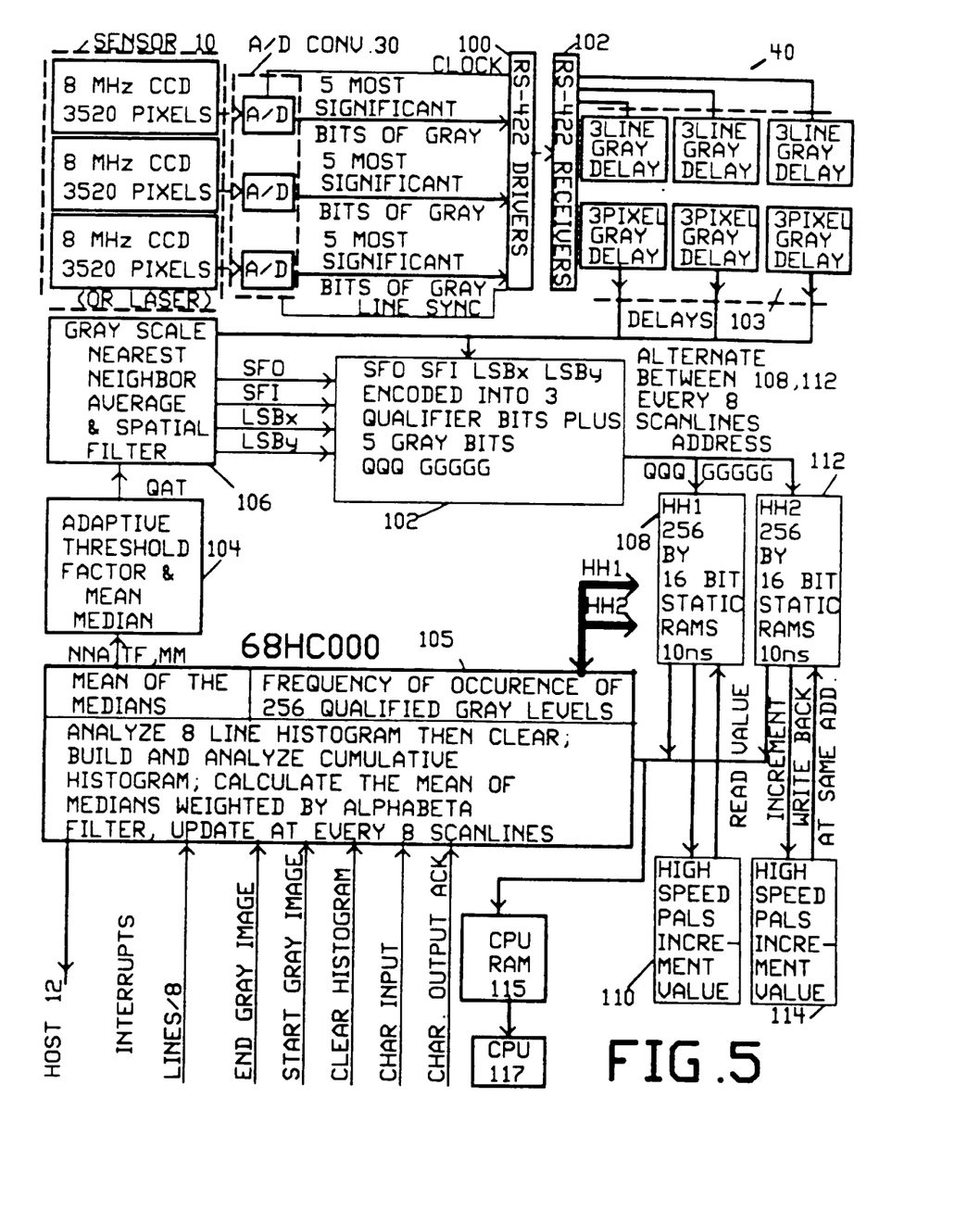
FIG. 5 shows a block diagram for the histogram hardware section.
Figures 6, 7, 8, 9, 10:
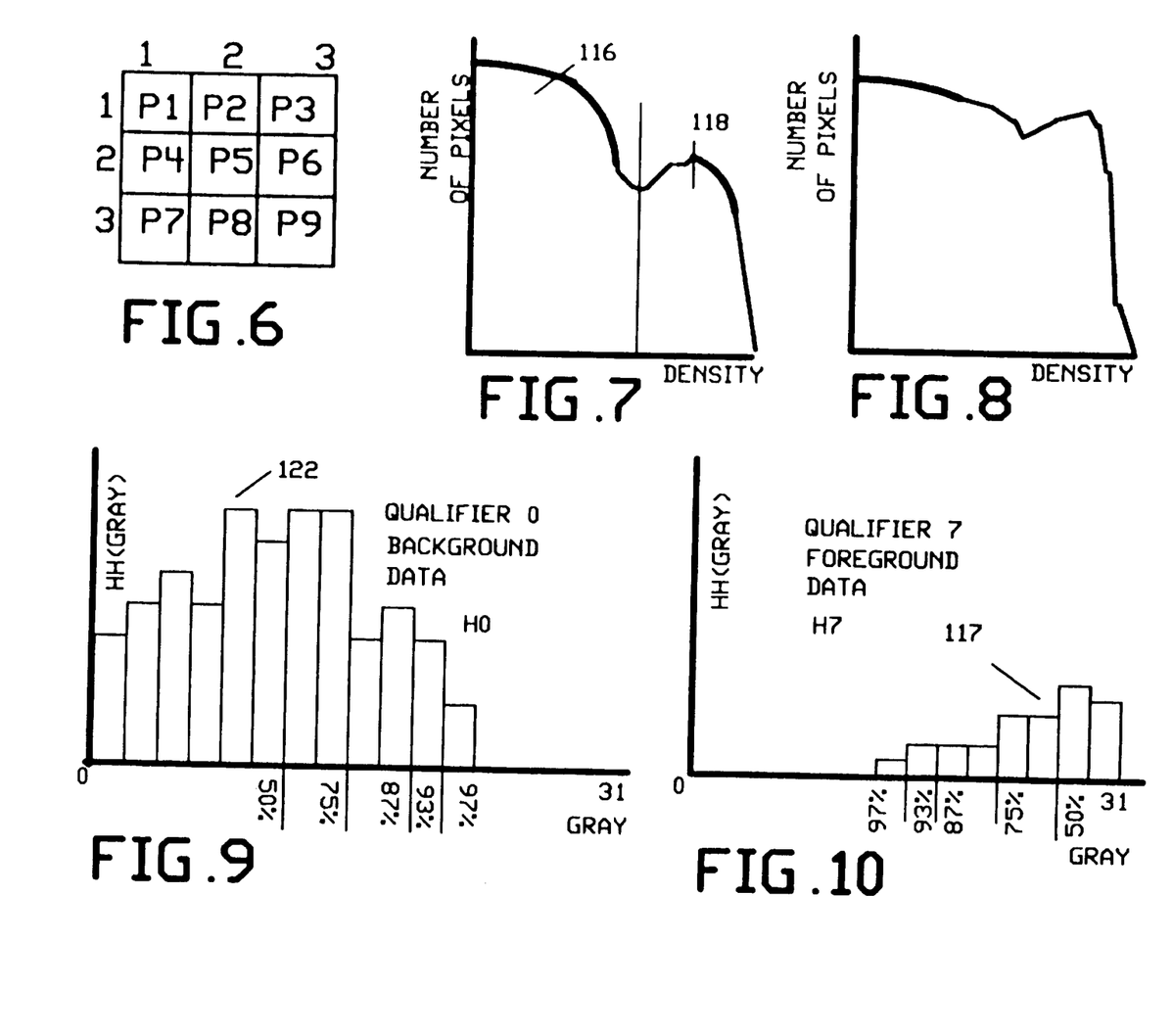
FIG. 6 shows a 3×3 array of pixels used by the quality adaptive threshold element of FIG. 5.
FIGS. 7 and 8 show raw histograms for two typical images.
FIGS. 9 and 10 show intermediate histograms derived by the histogram hardware in accordance with this invention.

The sensor 16 and A/D convertor 30 generate a byte or eight bits of information for each pixel for 256 levels of gray. The five most significant bits of these eight are used by the histogram hardware combined with 3 more significant bits of quality. As shown in FIG. 5, these five bits are fed through RS422 drives and receivers 100, 102 to delays 103. From the delays, they are fed into a qualitative adaptive threshold detector 104. The purpose of the detector is to enhance the edges of an image, and at the same time to smooth out noise and its operation is best understood in conjunction with the 3×3 array of pixels of FIG. 6. In this array, the 32 levels of gray or density for each of the pixels P1–P9 of the array have been received. Since these pixels are received in different order the section delays 103 are used for delaying the pixel data until it is required. For pixel 2,2 disposed at the center of the array of FIG. 6, the detector 104 calculates a threshold value QAT based on the equation:

$$QAT=NNA \times TF+(1-TF) \times MM$$

The term NNA is the arithmetic average of the densities of the pixels neighboring Pixel 2,2 in the array. TF is a threshold factor in the range of ⅜–⅝ and is dependent on black/edge pixels detected by the histogram hardware as discussed below. The factor MM is the recursive median of the means of the pixel densities and is digitized by a software "alphabeta" filter in microprocessor 105 as discussed above.

FIG. 5 also shows various interrupt signals which may be used to interrupt microprocessor 105. A source code for this microprocessor is appended hereto.

Detector 104 generates a binary detector bit DE which is 0 or white if the density gray level of pixel 2,2 i.e. P5 is smaller than QAT, and 1 or black if the level P5 is greater than QAT.

The binary detector bit DB for each pixel is fed to a spatial filter 106. The purpose of this filter is to qualify the grayscale value of each pixel based on its neighbors thereby differentiating between true gray levels which are characteristics of the actual image and false gray levels resulting from background noise, or pseudo-gray from sampling across transitions. This filter generates three output bits. The most significant bit termed SFO (spatial filter output) is obtained by reviewing the DB bits of the surrounding pixels. Referring to FIG. 6, a survey is taken of all the pixels and if the majority (e.g. 5–8) is black then SFO is also black or 1, and if the majority is white then the SFO is white or 0. Note the multibit NNA and QAT rise as the number of black pixels increases so it's harder to cross the threshold into black. But, the single bit SFO converts isolated dropouts ("salt and pepper") so QAT can enhance edges yet suppress noise.

The second bit in order of significance is the SFI(the spatial filter input) bit, which is the DB bit from determinator 104 delayed until the SFO bit is calculated. The least significant bit is the LSB bit and is equal to the SFO bit computed for the previous pixel in the y-direction. If the processing is done left to right then in reference to the array of FIG. 6 the LSB bit for pixel 2,2 is equal to the SFO bit of pixel 1,2. These three qualifying bits define the status of each pixel as indicated in the table below:

TABLE

| STATE | SFO | SFI | LSBx,y | DESCRIPTION |
|---|---|---|---|---|
| 0 | 0 | 0 | 0 | Background data |
| 1 | 0 | 0 | 1 | Transition in y-direction from background to foreground |
| 2 | 0 | 1 | 0 | Spatial filter conversion from FALSE foreground to background |
| 3 | 0 | 1 | 1 | Illegal for SFO = 0 |
| 4 | 1 | 0 | 0 | Illegal for SFO = 1 |
| 5 | 1 | 0 | 1 | Spatial filter inversion from false background to true foreground |
| 6 | 1 | 1 | 0 | Transition in y-direction from foreground to background |
| 7 | 1 | 1 | 1 | Foreground data. |

Since SFO converts isolated drops (SFI LSB) states 3 and 4 will not occur, and may be used for a fourth signal LSBx to indicate a transition in the x-direction in a manner similar to states 1 and 6. Quantitatively, these three bits may be used to construct several partial histograms as follows. The three bits are appended as the most significant bits to the other five gray bits and are encoded into eight bit words for each pixel by encoder 107. The resultant 8-bit word is used as an address to a RAM. The RAM 108 is used to generate a composite histogram for the 8 lines by accumulating the number of times each density gray level of the qualified gray scale appears in the image. Thus in response to the 8-bit address described above at its address port RAM 108 retrieves the corresponding number for that particular gray scale and loads it to a PAL (programmable logic array) 110. The PAL increments the number and returns it to the RAM 108 all in one pixel dwell time. The next 8 lines are fed to a second RAM 112 which is similarly updated through a second PAL 114. Each RAM 108, 112 is incremented in less than 42 nanoseconds. Simultaneously, a cumulative RAM 115 and another CPU 117 is used to construct a composite histogram for the whole image. Thus, while RAMs 108 and 112 are cleared after every 8 lines, RAM 115 maintains its content so that at the end of the scan, cumulative histograms are collected for the whole image.

Two raw or unqualified histograms are shown in FIGS. 7 and 8. The horizontal axis on these types of graphs indicate density, while the vertical axis indicate the number of pixels with a particular density. As it can be seen from that FIG. 7, an ideal histogram graph includes two well-defined modes 116 and 118. Mode 116 is due to background information while smaller mode 118 is due to the foreground information and represents the actual data that describes the image. This type of bimodal histogram is easy to analyze because there is a well defined separation between the two modes. The histogram for an image which has very high deconvolution and low contrast and which is hard to decipher is shown in FIGS. 7 and 8. This histogram is hard to analyze in this form because the two modes are almost non-existent.

The present invention uses the qualifying bits to generate eight qualified histograms H0–H7, each corresponding to one of the states shown in the TABLE. Thus histogram H0 is defined by the pixels having qualified bits QQQ with 000 as the most significant bits, while H7 is defined by all the pixels having 111 as the most important bits. These two histograms are shown in a quantitized form in FIGS. 9 and 10 respectively. Next, in order to determine the extend of overlap if any between these two histograms further processing is done as described below. Histograms H1–H6 show edge transitions and may be used for deconvolution analysis.

Figure 11:
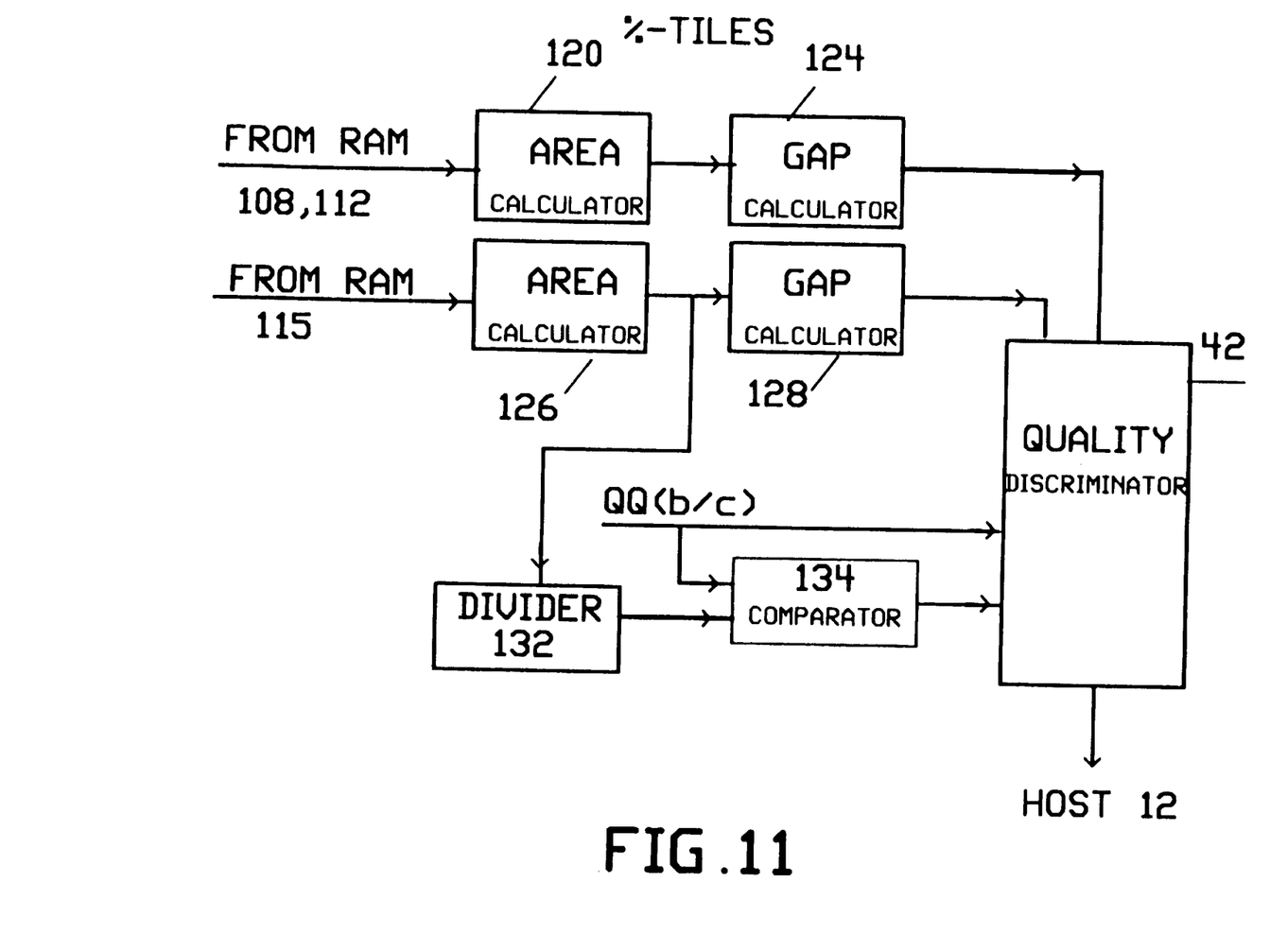
FIG. 11 shows further details of the histogram processor.

Since histogram H0 is indicative of the background of the image and histogram H7 is indicative of the foreground, any overlap between these two histograms is due only to the lack of contrast or other problems with the image and is completely independent of the image processing scheme used, or the characteristics of the sensor. This overlap can be measured in a number of different ways. For example, as shown in FIG. 11, the data corresponding to each histogram can be fed from the RAM 108 into a first area calculator 120 which calculates the area under the curve (122 in FIG. 9). This area is provided to a percentile calculator 124 which calculates the grayness at appropriate areas lying under the curve by dividing the resulting area by 2, 4, 8, 16 and 32. (This is easily done in microprocessor 105 by a left shift.) The first percentile calculated is indicated by line 50%. This line is positioned at the median gray position along the horizontal axis. The area under curve 122 to the left of the 50% line comprises 50% of the total area. Similarly, the respective lines 75%, 87%, 93% and 97% are calculated by area calculator 124. For the histograph H0 the calculation proceeds from low density (0) towards the high density (31). For H7 the calculation is reversed. For each percentile line the corresponding gray value is recorded for curves H0 and H7.

Next, a gap calculator 124 is used to determine the relative positions of the respective percentile lines. Thus, the position along the horizontal axis of the 50% line of H0 is compared to the position of the 50% line of H7, the position of the 75% line of H0 is compared to the 75% line of H7 and so forth. If all the percentile lines for H0 are to the left of the corresponding percentile lines for H7, then the corresponding image is an acceptable image. If any of the percentile lines of H0 are to the right of the corresponding percentile lines of H7 then the image may be unacceptable. The image may be rejected outright or the threshold factor TF may be too high or too low. Therefore, the calculations may be repeated by using a different threshold factor in the quality adaptive threshold determinator 104 (FIG. 5).

The calculations shown in FIG. 11 from HH RAM 108 & 112 are repeated for every set of 8 n lines. These calculations are symbolized in FIG. 11 by area calculator 120, and gap calculator 124. In addition, CPU 117 duplicates these calculations 126, 128 for the cumulative histogram in 115 as a whole image is scanned.

In order to verify the result of the test performed by the quality quotient section, the area calculator 126 also adds variables A1, A1' and A2, where A1, A1' is the sum of the areas under curves H0 and H7, and A2 is the sum of the areas of H1 . . . H6. These variables are fed to a divider 132 which generates the estimate of compression ratio (A1+A1'+A2)/A2 and fill factor A1'/(A1+A1'+A2). The ratio is fed to a comparator 134, which also receives the quality quotient QQ as an input. Ideally, since compressed bits are proportional to transitions these ratios b/c=A1'/A2=(A1+A1'+A2)A2*A1' (A1+A1'+A2) should be approximately the same. If they are not the comparator sends a signal to quality discriminator 42.

Quality discriminator 42 sends signals to host 12 to reject the image if the image fails any of the tests described above. If the image passes the test, the host either stores the original data directly from the compressor 36 or alternatively may store a qualified image from space filter 107.

Figure 12:
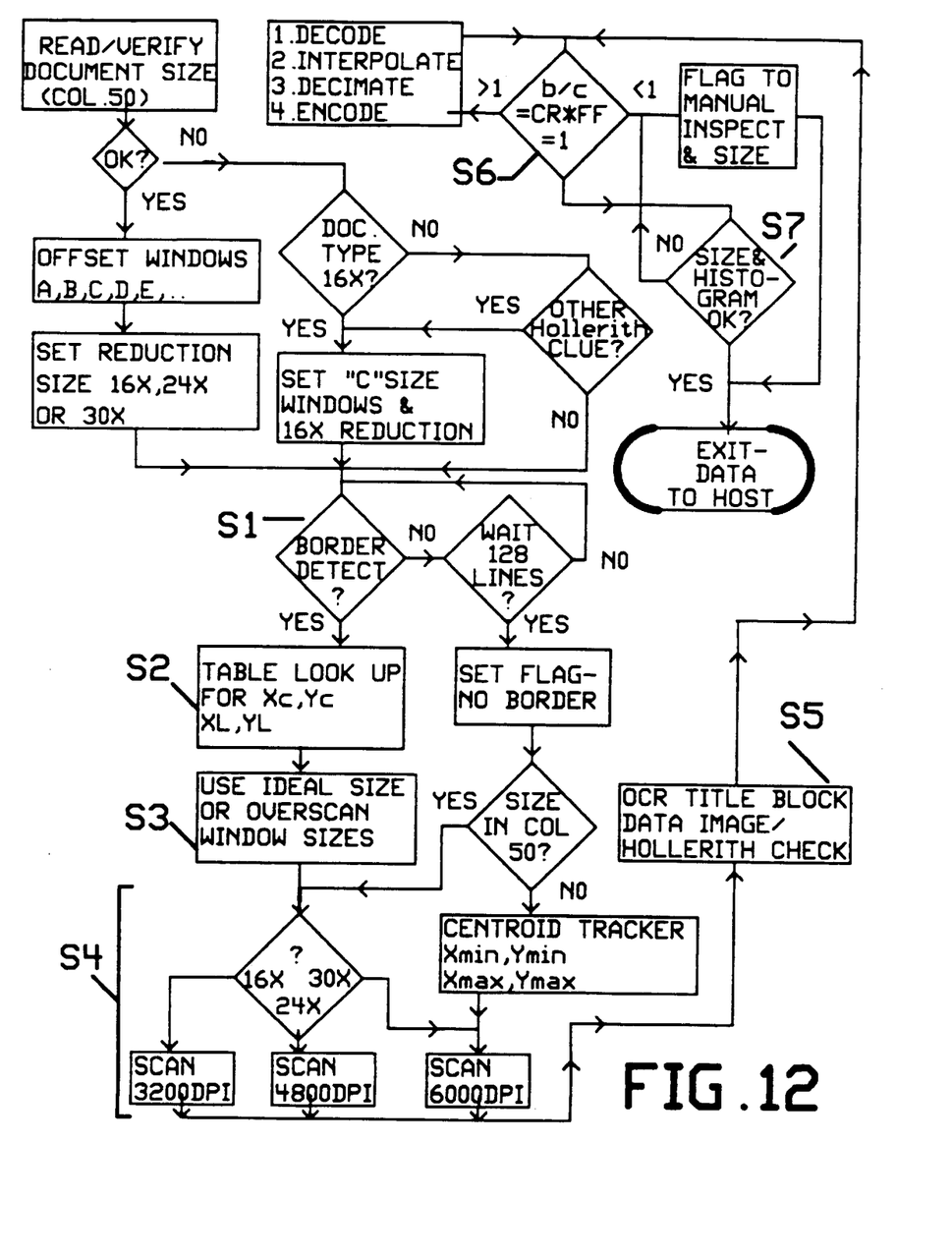
FIG. 12 shows in a flow chart form the operation of the autosizing element of FIG. 1.

The operation of the autosize element 34 is shown functionally in FIG. 12. Initially, information about the image including its size and margins are read through the card holder (assuming of course that this information is available on the card of the film). One such image 44 is shown in FIG.

Figure 13:
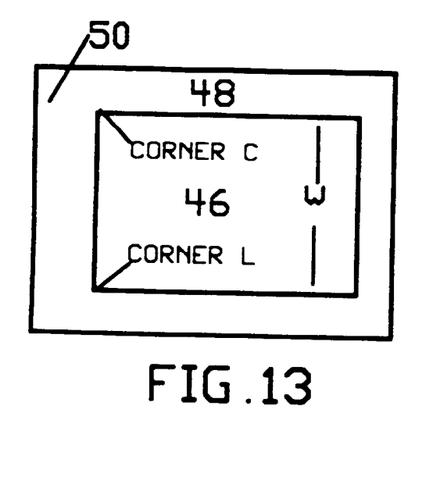
FIG. 13 shows the corners of the borders of FIG. 4 being sensed by the image adjusting element.

13. The image may include drawings or text in area or window 46 defined by a border 48. Outside border 48 there is a noisy space 50 which only contains margin information and should otherwise be discarded. The dimensions of the border may be indicated on the Hollerith data card, or they must be determined from the image if not found-on the card holding the corresponding film. For example the card may specify that the film represents a E-size drawing having a dimension of 34"×44" which has been reduced by a factor of 30X. The size of the drawing automatically sets the nominal position of the L corner. A lookup table then may be used in step S2 to determine the dimensions of the border 48, when scanned at 6,000 dots/inch or better.

Figure 14:
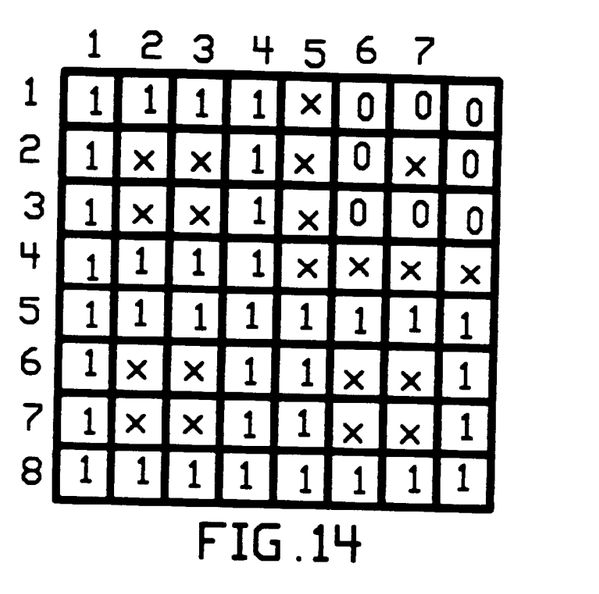
FIG. 14 shows a typical pixel array used to sense the border corners of FIG. 5.

Next, in step S3 a search is conducted for the actual position of the lower left hand corner L of the border. For example, starting from the nominal position of the image 44 (which has been divided into pixels) an 8×8 "fuzzy logic" array of pixels is examined to determine if corner L is included. If corner L is not found, a new array is defined by going upward by a row of pixels. The next array is defined by moving horizontally by one column. By these repeated iterations, the corner should be found rapidly. The corner L is found when an array is indicated which looks the 8×8 array shown in FIG. 14. In this Figure black pixels are indicated by numeral 1, white pixels by numeral 0. An X indicates "don't care" conditions. This type of recognition scheme permits reliable border detection even for very poor drawings.

In step S2 if corner L is found the system looks for upper left hand corner C. Since the dimensions W and S are known then the left corner should be nominally right above corner L at a distance W. In step S3 the member 34 looks for corner C at distance W. If corner C is not at a preselected number of pixels within the nominal position as found in step S3 then member 34 attempts to find the corner by the array method described above for corner L. If the corner is found, then the image area is cropped to window 46 since dimension S is already known.

Thereafter, the scanning density (3200 dots/inch, 4800 dots/inch, or 6000 dots/inch) is set based on the reduction size in steps collectively indicated as S4. In step S5 the title block is located and checked against preset dimensions (or as indicated by the Hollerith card) to insure that the image has been scanned correctly. In step S6 an independent check is made on whether the ratio b/c is equal to one.

If a ratio of b/c close to 2 is indicated, then the wrong reduction ratio was used and the autosizing operation must be repeated.

Figure 15:
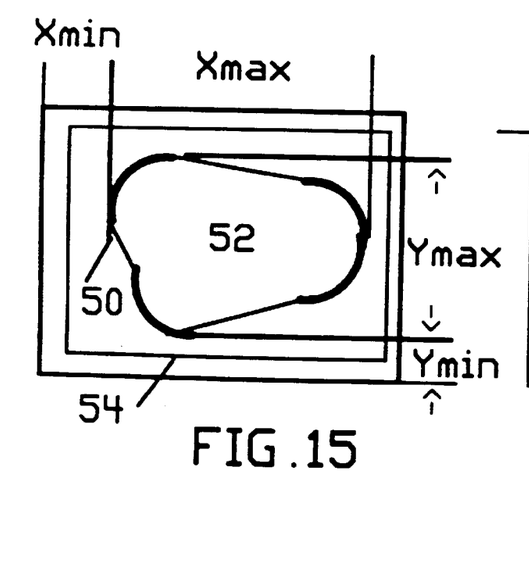
FIG. 15 shows a typical image without borders for storage by the image processing system of FIGS. 1–3.

Step S7 represents the analyses preferred by the quality control and histogram hardware sections already described. In many cases an image is provided with no border, in which case the system must be able to handle an image having an indeterminate outline 50 as shown in FIG. 15. In this situation, or if either corner C or L are not found then in step S1 the whole image is reviewed either to find its centroid point 52 (i.e. the center of gravity of outline 50), or preferably to determine by feature extract the distance XMIN, XMAX, YMIN and YMAX from the lower left hand corner of the window (step S7). Next, in step S9 a standard border such border 54 is assigned to the image. Border 54 is the smallest standard size border which will surround the outline 50 completely. The image is sized so that the area outside border 54 is discarded.

Figure 16:
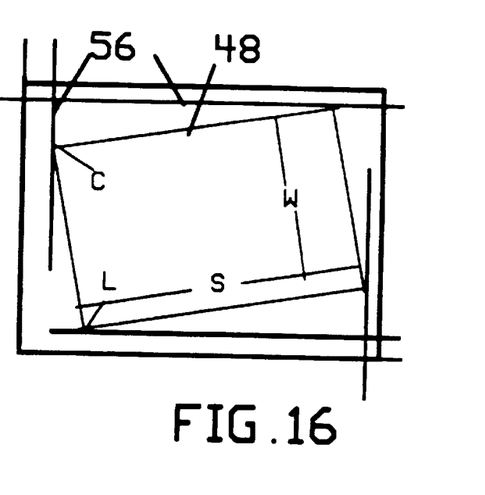
FIG. 16 shows a typical skewed image for storage by the image processing system of FIGS. 1–3.

As shown in FIG. 16, a document may have been transferred to a film slightly so that the corner C of its border 48 does not line up vertically with corner L. In this case, in step 7, an artificial border 56 is drawn around border 48 to provide a rectangular area which is larger than the area defined by the original border 48 but is still smaller than the area of the total film.

The autosizing element is shown in FIG. 1 as being disposed between the image processor 30 and the AQA section 24. However, this element may also be placed so that its output is fed to compressor 36 and AQA section 24.

Obviously, numerous crosschecks, autoverifications and modifications can be made to the invention described herein without departing from its scope as defined in the appended claims.

What is claimed is:

1. An image processing system for converting optical images into corresponding digital data, said system comprising:
  a. sensing means for generating digital sensor signals corresponding to an image, said digital sensor signals having a fill factor;
  b. compressing means for compressing said digital sensor signals to generate compressed signals, said compressed signals having a compression ratio;
  c. autosizing image processing system for automatically detecting an image window within an image, for eliminating digital sensor signals outside said window, and for automatically determining and controlling the size of an image and its associated scanning parameters when unable to determine assigned codes regarding the same, the autosizing image processing system comprising:
    a realtime multidiscriminant processor of image video data prioritized to minimize overscanning and need to rescan or reject incorrect or missing data codes and thereby maximize the input scan rate throughput, including:
      logic means to detect the most likely first corner encountered of an image border although it may be skewed or fuzzy or offset excessively;
      statistical means to recognize two or more most likely corners of an image border although it may be skewed or fuzzy or offset excessively;
      contrast comparator means to statistically recognize the most likely extremes of the image content Xmin, Ymin, Xmax, Ymax although it may be a noisy image or without any detectable border or has one that is skewed or fuzzy or offset beyond normally acceptable margins; and
      scan conversion means for employing interpolation and decimation to vary the window size and the number of scan lines and picture elements therein thereby providing improved image quality.

2. The image processing system of claim 1 wherein the autosizing image processing system further comprises:
  video correlator means for substantially instantly determining within one picture element dwell time the correlated number of ones (1) and zeros (0) and don't care (X) pixels in a realtime statistical bit-map sampling window for computing the probability and confidence level of the image extent free of integrating counting said number of correlation pixels or storing entire image.

3. The image processing system of claim 2 wherein the autosizing image processing system further comprises:

array means addressable by the video contents of the picture elements within a statistical sampling window and provides an output of the number of 1's, 0's, and X's for computing the probability and confidence level of the image extent free of counting or integrating said numbers.

4. The image processing system of claim 1 wherein the autosizing image processing system further comprises:

adaptive scanning control means to locate a moveable window wherein an optical character recognition (OCR) is employed to read data relating to the scan parameters and quality.

5. The image processing system of claim 1 wherein the autosizing image processing system further comprises memory for the entire image for subsequent non-instantaneous processing to enhance image quality assurance.

* * * * *